United States Patent
Chino et al.

(10) Patent No.: US 6,642,975 B2
(45) Date of Patent: Nov. 4, 2003

(54) TRANSFER APPARATUS

(75) Inventors: Naoyoshi Chino, Kanagawa (JP); Yasunori Tanaka, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 79 days.

(21) Appl. No.: 09/973,815

(22) Filed: Oct. 11, 2001

(65) Prior Publication Data
US 2002/0063808 A1 May 30, 2002

(30) Foreign Application Priority Data
Oct. 11, 2000 (JP) ........................................ 2000-310203

(51) Int. Cl.[7] ............................................. G02F 1/1335
(52) U.S. Cl. ................................ 349/65; 349/62; 349/96
(58) Field of Search ............................... 349/65, 5, 176, 349/62, 113, 96

(56) References Cited

U.S. PATENT DOCUMENTS

| | | | |
|---|---|---|---|
| 5,970,215 A | | 10/1999 | Stephenson |
| 6,104,455 A | * | 8/2000 | Kashima ...................... 349/65 |
| 6,151,166 A | * | 11/2000 | Matsushita et al. ............. 349/5 |
| 6,172,809 B1 | * | 1/2001 | Koike et al. ................... 349/65 |
| 6,222,598 B1 | * | 4/2001 | Hiyama et al. ................ 349/65 |
| 6,344,886 B2 | * | 2/2002 | Oki et al. ....................... 349/65 |
| 6,356,322 B1 | * | 3/2002 | Shimura ........................ 349/65 |
| 6,433,853 B1 | * | 8/2002 | Kameyama et al. ......... 349/176 |
| 6,474,827 B2 | * | 11/2002 | Shinohara et al. ............ 349/62 |
| 6,480,307 B1 | * | 11/2002 | Yang ............................. 349/65 |
| 6,493,051 B2 | * | 12/2002 | Ha et al. ...................... 349/113 |
| 6,504,589 B1 | * | 1/2003 | Kashima et al. .............. 349/96 |

FOREIGN PATENT DOCUMENTS

| | | | |
|---|---|---|---|
| JP | 4-194832 | 7/1992 | ........... G03B/17/52 |
| JP | 10-309829 | 11/1998 | ........... B41J/2/445 |
| JP | 11-242298 | 9/1999 | ........... G03B/27/32 |

OTHER PUBLICATIONS

Japanese Abstract No. 08160422, dated Jun. 21, 1996.
Japanese Abstract No. 2000162595, dated Jun. 16, 2000.
Japanese Abstract No. 1242298, dated Sep. 7, 1999.
"Color TFT Liquid Crystal Display", p. 206–207, published by Kyoritsu Shuppan second ($2^{nd}$) Ed. Sep. 2, 1997.

* cited by examiner

Primary Examiner—John F. Niebling
Assistant Examiner—Walter L. Lindsay Jr.
(74) Attorney, Agent, or Firm—Sughrue Mion, PLLC

(57) ABSTRACT

The present invention relates to a transfer apparatus having a light source, a substantially parallel light generating element, a transmission-type image display and a photosensitive recording medium being arranged in a straight line along the traveling direction of light of the light source, for transferring, onto the photosensitive recording medium, a display image having passed through the transmission-type image display, the substantially parallel light generating element having a porous board provided a plurality of through-holes, and a thickness of the porous board is equal to or greater than three times a diameter of each of the through-holes or an corresponding diameter.

12 Claims, 4 Drawing Sheets

→ NON-REFLECTION LIGHT
—·—▸ ONCE-REFLECTION LIGHT
······▸ TWICE-REFLECTION LIGHT

TRANSFER APPARATUS

BACKGROUND OF THE INVENTION

1. Field of the Invention

The present invention relates to a transfer apparatus which displays an image recorded in digital form by a digital still camera (DSC), a video camera, a personal computer or the like through a transmission type image display means formed by a liquid crystal display (LCD), and transfers the displayed image onto a photosensitive recording medium, such as an instant photographic film, which develops color by light, resulting in forming an image.

2. Description of the Related Art

Conventionally known examples of a method for transferring (or printing) or recording a digital-recorded image to or on a photosensitive recording medium include an ink jet system using a dot-type printing head, a laser recording system, and a thermal recording system.

A printing system such as the ink jet system has various problems. For example, printing takes more time, ink is likely to cause clogging, and precision printing results in the printed sheet paper being moistened by ink. The laser recording system involves an expensive optical component such as a lens, resulting in high cost performance. Further, the laser recording system and the thermal recording system require considerable power consumption, and are not suited to be carried about.

Thus, generally speaking, the transfer apparatus used in these systems and, in particular, the ones used in the ink jet system have a problem in that the more precise the device, the more complicated the driving mechanism and the control mechanism, and the larger and the more expensive the device, printing taking more time.

In this regard, JP 10-309829 A and JP 11-242298 A disclose transfer apparatus of the type in which a display image is formed on a photosensitive recording medium such as an instant film, using a liquid crystal device, thereby achieving simplification in structure and a low cost.

The electronic printer disclosed in JP 98-309829 A is capable of copying the display screen of a liquid crystal display on a photosensitive medium to produce a hard copy of a quality equal to that of a photograph. However, in this electronic printer, an optical component such as a rod lens array is arranged between a display screen of the liquid crystal display and a photosensitive medium, so that a predetermined distance (total conjugate length) is required between them. In the example shown, a distance of 15.1 mm is required. Further, an optical component is generally expensive.

In the transfer apparatus disclosed in JP 11-242298 A, there is no need to use an expensive optical component such as a lens and/or to secure an appropriate focal length. Thus, as compared with a conventional transfer apparatus, a further reduction can be achieved in terms of size, weight, power consumption, and cost. As shown in FIG. 8, a photosensitive film 400 is closely attached to the display surface of a transmission type liquid crystal display (hereinafter referred to as LCD) 300, and a light source (back light 100) provided on the opposite side of the photosensitive film 400 with respect to the LCD 300 is turned on. That is, a fluorescent lamp 101 is switched on to turn on the back light, so that the image displayed on the LCD 300 is transferred to the photosensitive film 400.

Further, as shown in FIG. 8, the above-mentioned document discloses another embodiment, according to which a lattice 200 is provided between the back light 100 and the LCD 300, so that diffusion or light from the back light 100 is restrained. That is, the light is approximated to parallel rays. Further, by providing a spacer 201 having a rectangular hollow portion between the lattice 200 and the LCD 300, it is possible to prevent the image of the frame of the lattice 200 (the shadow due to the frame) from being taken by the photosensitive film 400, thus improving clarity of the image formed on the photosensitive film 400 to a satisfactory degree from the practical point of view without providing an optical component or maintaining a predesired focal length.

Further, as shown in FIG. 7, the above documentation discloses an example of a transfer apparatus in which thickness of the LCD 300, i.e., the total thicknesses of the following components: a polarizing plate 301 on the display surface side, a glass substrate 302, a liquid crystal layer 303, a glass substrate 304, and a polarizing plate 305 on the back light 100 side is 2.8 mm and in which the image on the screen of the LCD 300 with a dot size of 0.5 mm is transferred to the photosensitive film 400. To prevent diffusion of light from the LCD 300, a 5 mm lattice is provided with a thickness of 10 mm, and a 20 mm spacer 201 is arranged between the lattice 200 and the LCD 300. Further, the LCD 300 and the photosensitive film 400 are closely attached together to effect image transfer without involving blurring (unclarity) of the image.

In this casing, an image displayed with an original dot size of 0.5 mm is transferred with an enlarge dot size of up to 0.67 mm, which is enlarged by approximately 0.09 mm at one side, However, the image obtained is satisfactory on practical.

As described above, in the transfer apparatus disclosed in JP 11-242298 A, image transfer is effected, with the liquid crystal display (LCD) and the photosensitive film being closely attached together, to prevent blurring (unclarity) of the image and to obtain an image satisfactory from the practical point of view. It is to be noted, however, that exposure of the photosensitive film in this arrangement involves the following problems.

First, as shown in FIG. 8, on the outermost surface of the LCD 300, the film-shaped polarizing plate 301 is arranged, closely attaching to the photosensitive film 400. As a result, when the photosensitive film 400 is moved to perform a post-processing, the photosensitive film 400 and the polarizing plate 301 are mutually rubbed thereby flawing the film-shaped polarizing plate 301, and the flaw on the polarizing plate 301 is transferred to the photosensitive film 400. Further, this flaw causes scattering of light, resulting in deterioration of the image quality.

It might be possible for the polarizing plate and the photosensitive film to be closely attached together during exposure and slightly spaced in addition to each other when the photosensitive film is moved. For this purpose, however, it would be necessary to provide, apart from the photosensitive film moving mechanism, a mechanism for effecting close attachment and detachment of the photosensitive film, which is contradictory to the requirement for reduction in cost and size.

Further, generally, a photosensitive film, e.g., an instant film easiest to use, is accommodated in a lightproof casing until it is loaded in a transfer apparatus. Because this lightproof casing is equipped with an opening frame somewhat larger than the film, following procedure is required; that the photosensitive film can be brought into close contact with the polarizing plate.

First, prior to exposure, a signal sheet of photosensitive film is extracted singly from the lightproof casing, and brought into close contact with the polarizing plate surface on the surface of the LCD. In this state, exposure is performed, and, therefore, the photosensitive film is separated from the polarizing plate surface, and moved for a next processing (In the casing of an instant film, a processing liquid tube provided in the film sheet is pushed and broken).

Such a procedure must be repeated for each photosensitive film. In particular, separating the closely attaching photosensitive film to the polarizing plate surface therefrom does not meet the requirements of automation (or mechanization).

Recently, a screen of LCDs have progressed in terms of fine definition, and LCDs with more number of pixels and a smaller dot size are being commercialized. For example, as LCDs using low-temperature polysilicon type TFTS, UXGA (10.4 inches: 1200×1600 pixels), XGA (6.3 and 4 inches; 1024×768 pixels) are on the market.

An attempt to apply an LCD with such a high-definition screen to the transfer apparatus disclosed in JP 11-242298 A would lead to the following problem. In a casing of UXGA, the dot size of each of the RGB pixels is approximately 0.04 mm on the shorter side. In a transfer apparatus as disclosed in the above-mentioned document, when the dot size is enlarged, it would be impossible to transfer an LCD image of such a minute dot size to a photosensitive film with satisfactory clarity in a state in which the dots of the RGB pixels are clearly distinguishable.

SUMMARY OF THE INVENTION

It is an object of the present invention to eliminate the above problems in the conventional art and to provide a transfer apparatus which can realize a substantial reduction in size, weight, power consumption, and cost with a simple structure and which can also be formed as a portable device.

Further, it is another object of the present invention, in addition to the above to provide a transfer apparatus capable of removing scattered light elements from light incident on a transmission-type image display, making this light have only components closer to components of parallel light, and making the light incident normally to the image display, thereby transferring an image (forming an image) with a high definition on a photosensitive recording medium by the light carrying the display image which has passed through the image display, resulting in obtaining a transferred image having a fine definition.

In order to achieve the above objects, the inventors have devoted themselves to researching a transfer apparatus that is capable of obtaining a fine-definition image, practical, and capable of using a transmission-type image display such as a liquid crystal display. As a result of this research and development, in order to prevent blurring (low definition) of the image and obtain the transferred image with fine definition using a simple and practical device construction, the inventors have learned that it is necessary to have a substantially parallel light generating element remove the scattered light elements from the light incident on the image display so that the light has only elements closer to those of parallel light and to make the light incident normal to the image display at a perpendicular angle. In order to achieve this, the inventors found that it was necessary to construct the substantially parallel light generating element constituted by a porous board provided with a plurality of through-holes, and necessary to set the value of the ratio of the thickness of the porous board to the diameter of the through-holes or corresponding diameter within a predetermined range, resulting in completing this invention.

The present invention provides a transfer apparatus having a light source, a substantially parallel light generating element, a transmission-type image display unit and a photosensitive recording medium which are arranged in a series along the traveling direction of light of the light source, for transferring onto the photosensitive recording medium a display image having passed through the transmission-type image display means, wherein the substantially parallel light generating element is formed by a porous board provided a plurality of through-holes, and a thickness of the porous plate is equal to or greater than three times a diameter of each of the through-holes or a calculated diameter corresponding the former diameter.

Preferably, at least the inner surfaces of the through-holes in a surface of the porous board, is a surface having a reflectance of 2% or less.

Preferably, a cross-sectional shape of the porous board is formed in a round or polygonal manner.

Preferably, a size of the image displayed on the image display unit is substantially as same as a size of the image transferred to the photosensitive film.

Preferably, a size of each pixel of the image display unit is equal to or less than 0.2 mm.

Preferably, the image display unit is a liquid crystal display.

DETAILED DESCRIPTION OF THE PREFERRED EMBODIMENTS

A transfer apparatus according to a preferred embodiment of the present invention will be described in detail with reference to the accompanying drawings.

Figure 1:
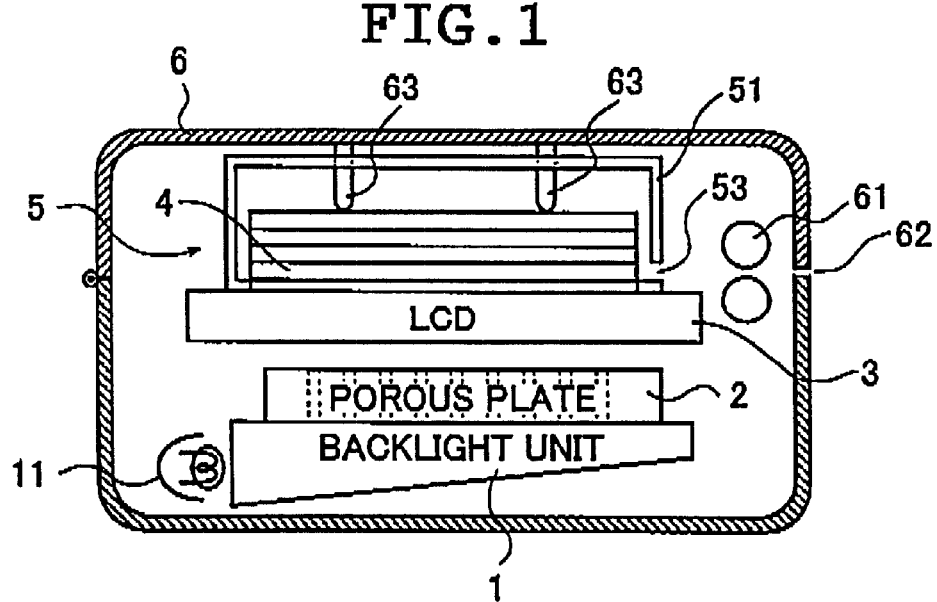
FIG. 1 is a schematic side sectional view of a first embodiment of a transfer apparatus according to the present invention.
Figure 2:
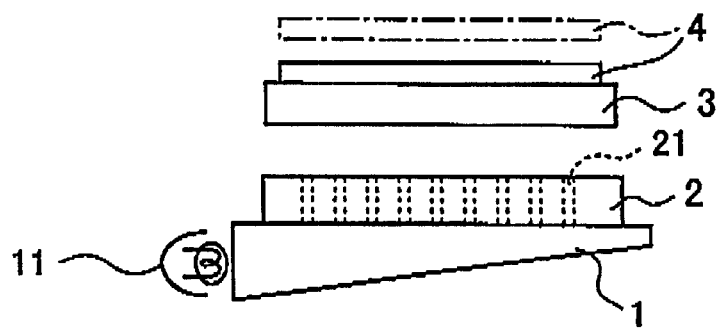
FIG. 2 is a conceptual side sectional view illustrating of the transfer apparatus of FIG. 1.

FIG. 1 is a schematic side sectional view of a transfer apparatus according to an embodiment of the present invention. FIG. 2 is a conceptual side sectional view showing a main portion of the transfer apparatus shown in FIG. 1.

As shown in these drawings, the transfer apparatus of the present invention comprises a back light unit 1 serving as a light source, a porous board 2 for generating substantially parallel rays, a liquid crystal display device (LCD) 3 for displaying an image recorded in digital manner, a film casing 51 accommodating photosensitive films 4, and a main body casing 6 containing the back light unit 1, the porous board 2, the LCD 3, and the film casing 51.

The porous board 2, the LCD 3, and the photosensitive films 4 are arranged in series and preferably in a non-contact state along the direction in which the light from the back light unit 1 travels. If it is possible to emit light of sufficient intensity from a light source, i.e., the back light unit 1 for effecting exposure of the photosensitive film 4 in a short time with the display image transmitted through the LCD 3, there is no need to provide the porous board 2.

The back light unit 1 irradiates the LCD 3 all over from behind the LCD 3 using uniform light, which is a planar light source having a light emission surface substantially the same as the display screen of the LCD 3. It comprises a bar-shaped lamp 11 formed by a cold-cathode tube or the like, a light guide plate (not shown) for introducing the light transmitted from the bar-shaped lamp 11 in a predetermined direction, a reflection sheet (not shown) for reflecting the light introduced to the light guide member in a direction substantially normal thereto, and a back light assembly having a diffusion sheet (not shown) for making uniform the light reflected by the reflection sheet, a prism sheet or the like.

There are no particular limitations regarding the back light unit 1 used for the present embodiment. It may be of any type as long as it is a planar light source which uniformly diffuses light transmitted from a cold cathode tube 11, using a back light assembly composed of a light guide plate, a reflection sheet, a diffusion sheet, a prism sheet, etc. It is possible to use a well-known LCD back light unit. In the example shown, the size of the light transmitting surface may be the same as a size of the display screen of the LCD 3 or a photosensitive surface of the photosensitive film 4. However, this should not be always the case. It may be somewhat larger than the size of the display screen of the LCD 3 or the photosensitive surface of the photosensitive film 4.

As long as it is a planar light source capable of transmitting light of a desired intensity, the back light unit 1 used for the present embodiment may also consist of an LED array light source, a light source using an organic EL panel, an inorganic EL panel or the like.

As needed, the porous board 2 used in the present embodiment is arranged between the back light unit 1 and the LCD 3, which converts the light from the back light unit 1 into parallel rays. It is a substantially parallel rays generating element for making, as much as possible, light incident on the LCD 3 into parallel rays, and consists of a rectangular board of a predetermined thickness having a large number of through-holes 21 of a predetermined size arranged at a predetermined pitch.

Instead of the porous board 2, it is also possible to use a lattice or the like. However, in view of the ease with which it can be produced, it is preferable to use a porous board.

Further, in the present embodiment, the distance between the porous board 2 and the LCD 3 is set at preferably 0.05 to 10 mm, and more preferably at 0.1 mm to 5 mm. This is to prevent the pattern of the through-holes 21 of the substantially parallel rays generating element, e.g., the porous board 2, from appearing in the form of a "shadow" due to the diffused light. The above-set distance is made such that the appearance of the "shadow" as above-mentioned can be prevented, without deteriorating the clarity of the transferred image.

There are no particular limitations regarding the material of the porous board 2. It is possible, e.g., to use a metal plate such as an aluminum board or a resin board having a predetermined thickness. Nor are there any particular limitations regarding the thickness of the porous board 2. It may be appropriately selected in accordance with the requisite clarity of the transferred image or a size of the display screen of the LCD 3 and a photosensitive surface of the photosensitive film 4. From the practical point of view, the porous board 2 may be produced by, for example, stacking porous sheets together or resin molding. However, there are no particular limitations in this regard. It may be produced by any method including a method by which holes are formed by machining.

Further, a plurality of through-holes 21 provided in the porous board 2 may be arranged in any form and at any pitch as long as the through-holes 21 are arranged uniformly. For example, they may be arranged in a grid shaped-manner and, preferably a staggered manner. This staggered state is preferably minute. Further, a distance between through-holes is preferably formed as minute as possible. The distance therebetween is 0.05 mm to 0.5 mm, preferably 0.05 mm to 0.3 mm.

Figure 3A:
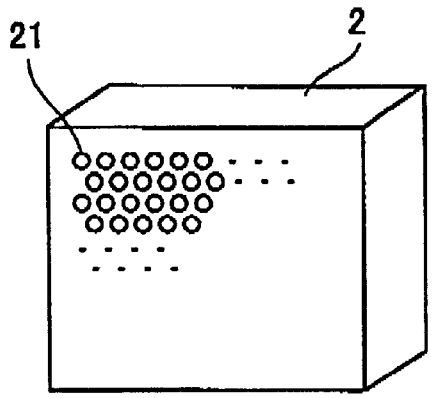
FIGS. 3A to 3C are perspective views illustrating a structure of one example of a porous board used as a substantially parallel light generating element in the transfer apparatus depicted in FIG. 1.
Figure 3B:
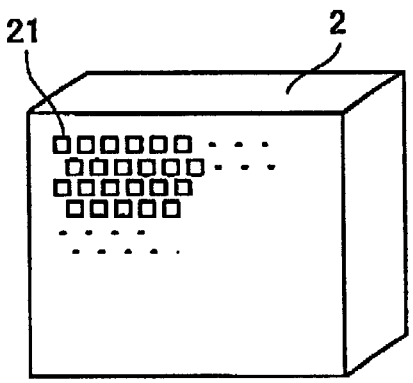
Figure 3C:
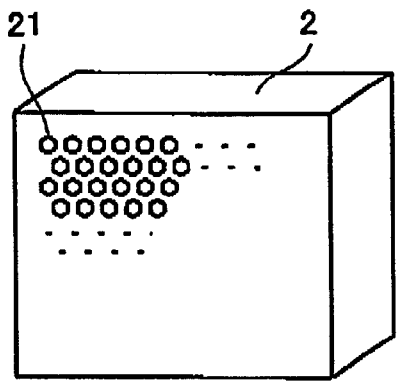

Further, a shape of the through-holes 21 provided to the porous board 2 is not particularly restricted, and may be, for example, cylindrical-tube-shaped, oval-tube-shaped, polygonal-tube-shaped, etc. That is, the sectional shape of the through-holes 21 is not particularly restricted, and may be made into the round shape depicted in FIG. 3A, oval shape, or polygonal shape such as the rectangle shape depicted in FIG. 3B or the hexagonal shape depicted in FIG. 3C, and the like. However, in order to facilitate production, a round shape or a polygonal shape is preferable. Further, the through-holes 21 are preferably formed by the holes being parallel through-holes in the direction of the thickness of the porous board 2. However, the holes can be formed, to be substantially parallel.

Further, there is not any particular restriction on the size of the through-holes 21, either. However, it is preferable that the diameter of the through-holes 21 in the porous board 2 (when they are round) or an corresponding diameter (when they are oval or polygonal, etc.) be equal to or less than 5 mm, and the thickness of the porous board 2 be equal to or greater than 3 times the diameter of the through-holes 21 or the corresponding diameter, preferably 5 times or more, more preferably 7 times or more. Note that the corresponding diameter mentioned above is of a length described as "4 multiplied by surface area/total perimeter length (or total periphery length)". The diameter of the through-holes 21 of the porous board 2 or the corresponding diameter is set at 5 mm or less, and the thickness of the porous board 2 is set at equal to or greater than three times the diameter of the through-holes 21 or the corresponding diameter. This is because these conditions are effective for obtaining parallel light using the porous board 2.

Further, it is preferable to construct at least the inner surfaces of the through-holes 21 of the entire surface of the porous board 2, as surfaces having a low reflectance, and it is more preferable to construct the entire surface of the porous board 2 as a low reflectance surface. Here, the low reflectance surface refers to a surface in which the reflectance of incident light is made to be low, such as a blackened surface or a roughened surface. Methods of forming the blackened surface are not particularly limited, but include, e.g., a method of using a black material for forming the porous board 2, and a method of blackening the surface. Note that black materials include, for example, a material containing 1% or more (preferably, 3% or more) of carbon black powder, and a material comprised of hardened carbon powder. Examples of the blackening processing include, for example, painting and chemical processing such as plating, oxidization and electrolysis. On the other hand, roughening processing is not particularly limited, either. A method may be freely selected such as a method of roughening a surface simultaneously while forming the holes, or a method of roughening the surface by means of processing performed after a mechanical processing method such as sandblasting or after a chemical processing such as etching. In this casing, as the degree to which the surface is roughened, a range of 1 $\mu$m–20 $\mu$m is available.

Note that, in the present embodiment, the reflectance of at least the inner surface of the through-holes 21 of the porous board 2, preferably, the reflectance of the low reflectance surface comprising the entire surface of the porous board 2 is preferably equal to or less than 2%. When the reflectance is equal to or less than 2%, then it is possible to effectively absorb the scattered, non-parallel light incident from the back light unit 1, thereby having only the substantially parallel light (including the parallel light) of the back light 1 emitted efficiently, and making this incident on the LCD 3. Note that the reflectance can be measured at a wavelength of 550 nm using a spectrum reflectance measuring instrument such as the MPC3100 manufactured by Shimazu Production, K.K.

The LCD 3 is a transmission-type image display for displaying a digitally stored image. In the present embodiment, the transmission-type image display is not particularly limited. If it is transmission-type electronic image display which is connected to a digital image data supplying unit such as a digital still camera, a digital video camera, a personal computer and which displays the display image as a transmitted image in response to the supplied digital image data, then the transmission-type image display includes any type of transmission-type electronic image display such as the LCD 3. In addition, the display includes a transmission-type image carrying member such as a photograph film on which the image has been formed. However, the LCD is preferably used as the transmission-type image display.

A predetermined gap is provided between the LCD 3 and the porous board 2. As stated above, this gap is preferably 0.05 mm to 10 mm, and more preferably 0.1 mm to 5 mm. It is preferable for the gap to be adjustable to an arbitrary dimension.

Figure 4:
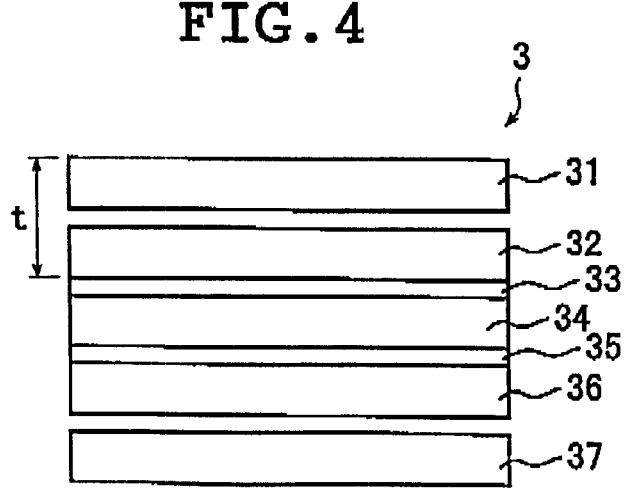
FIG. 4 is a perspective view depicting a construction of one example of a transmission-type liquid crystal image display device used in the transfer apparatus depicted in FIG. 1.

As shown in FIG. 4, the LCD 3 is formed by laminating together, from the photosensitive film 4 side toward the porous board 2 side (the back light unit 1 side), a film-shaped polarizing plate (hereinafter also referred to as the polarizing film) 31, a glass substrate 32, an electrode 33, a liquid crystal layer 34, an electrode 35, a glass substrate 36, and a film-shaped polarizing plate 37, the liquid crystal layer 34 being sandwiched between a part of the glass substrates 32 and 36 and a part of the polarizing plates 31 and 37. It goes without saying that although not shown, there are further provided a barrack matrix, an RGB color filter, an orientation film, etc., as is well known in the art. For example, in the casing of a TFT type LCD, the electrode 33 is a common electrode, and the barrack matrix, the RGB color filter, etc. are arranged between it and the glass substrate 32, the electrode 34 including a display electrode, a gate electrode, etc. Instead of the glass substrates 32 and 36, it is also possible to use resin substrates or the like.

The construction of the LCD 3 is not particularly limited, if a transmissive image can be displayed except for the sum total of the thickness of the polarizing film 31 and the glass substrate 32 on the photosensitive film side 4 described below. It may be an LCD having a well-known liquid crystal display mode and driven by a well-known driving system. Examples of the liquid crystal display mode include liquid crystal display modes using a polarizing plate, such as TN mode, STN mode, CSH mode, FLC mode, and OCB mode. Examples of the drying system include active matrix driving systems using TFTs, diodes, etc. and direct matrix drive systems using XY stripe electrodes.

There are no limitations regarding the size of the LCD 3. It is possible to select an appropriate size in accordance with the size of the photosensitive film. Further, there are no particular limitations regarding the dot size of each RGB pixel of the LCD 3. However, to obtain a clearer photographic image of high quality, it is preferable for the size of at least shorter side of each pixel to be not more than 0.2 mm. If the size is not more than 0.2 mm, it is possible to obtain a clearer transfer image.

There are no particular limitations regarding the number of pixels (or pixel density) of the LCD 3. However, to obtain a high-quality transfer image of high definition and high clarity, it is preferable to use an LCD having a high-definition screen with a small RGB pixel dot size which is recently on the market. Examples of such an LCD include TFT type LCDs, such as UXGA (10.4 inches; 1200×1600 pixels) and XGA (6.3 and 4 inches; 1024×768 pixels).

In the LCD 3 used in the present embodiment, it is preferable that the sum total of the thickness of at least the substrate 32 and the polarizing film 31 on the photosensitive film 4 side is as thin as possible. It is set at not more than 1.0 mm, more preferably not more than 0.8 mm, and most preferably not more than 0.6 mm. Still more preferably, it is preferable for the sum total of the thickness of the substrate 36 and the polarizing film 37 on the back light unit 1 (the porous board 2) side to be also small. It is set at not more than 1.0 mm, more preferably not more than 0.8 mm, and most preferably not more than 0.6 mm.

While there are no particular limitations regarding lower limit values, it is possible for example, to limit the thickness of the glass substrate 32 as not less than 0.5 mm because the thickness of the glass substrate 32 can only be reduced to approximately 0.5 mm. The sum total thickness values as mentioned above should not be construed restrictively. To realize the above condition, it is also effective to use a resin substrate instead of the glass substrate. In that casing, the lower limit value of approximately 0.5 mm can be further reduced.

Limitation of the sum total of the thickness of the substrate 32 and the polarizing film 31 on the photosensitive film 4 side to not more than 1.0 mm in the present invention will be explained based on followings.

By thus limiting the sum total of the thickness of these components, diffusion of light between the back light unit 1 and the LCD 3 is restrained. Strictly speaking, even if the display surface of the LCD 3 and the photosensitive surface of the photosensitive film 4 are held in a non-contact state, it is possible to obtain a brighter transfer image.

That is, in the transfer apparatus of the present embodiment, the displaying surface of the LCD 3 and the photosensitive surface of the photosensitive film 4 are spaced apart from each other by a predetermined distance to hold them in a non-contact state. This is certainly a condition necessary for obtaining a transfer apparatus which has a simple structure and which is of higher practical value and easy to handle. On the other hand, this is rather unpreferable from the viewpoint of obtaining a clear transfer image because it aggravates the light diffusion between the display surface of the LCD 3 and the photosensitive surface of the photosensitive film 4. In view of this, in the present embodiment, the disadvantage due to the non-contact state (the increase in light diffusion) is compensated for by the advantage due to the above-mentioned sum total thickness (the suppression of light).

Figure 8:
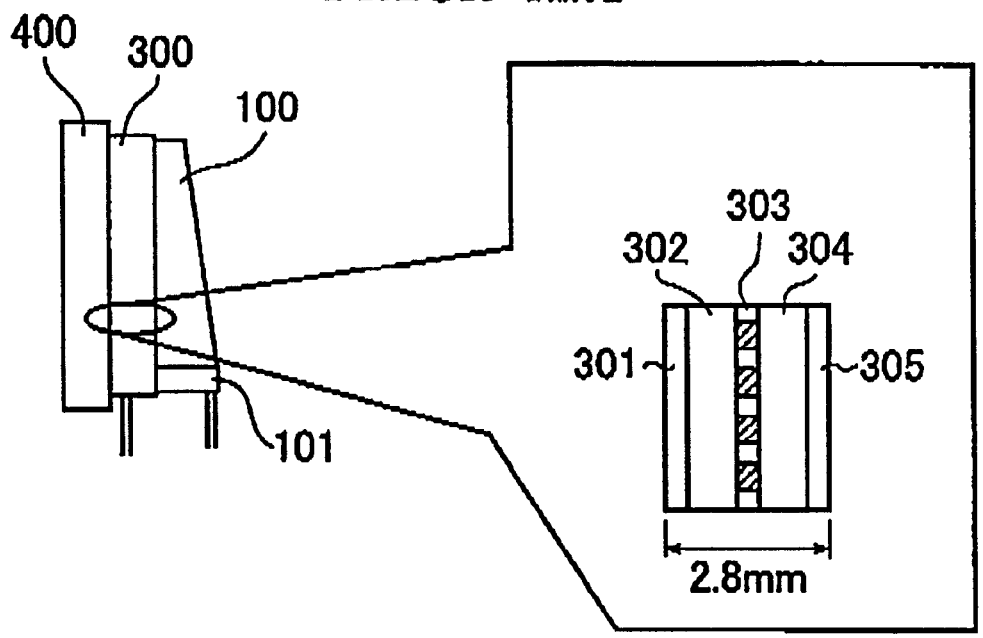
FIG. 8 is a side view illustrating a construction of one example of a conventional printing device.
Figure 9:
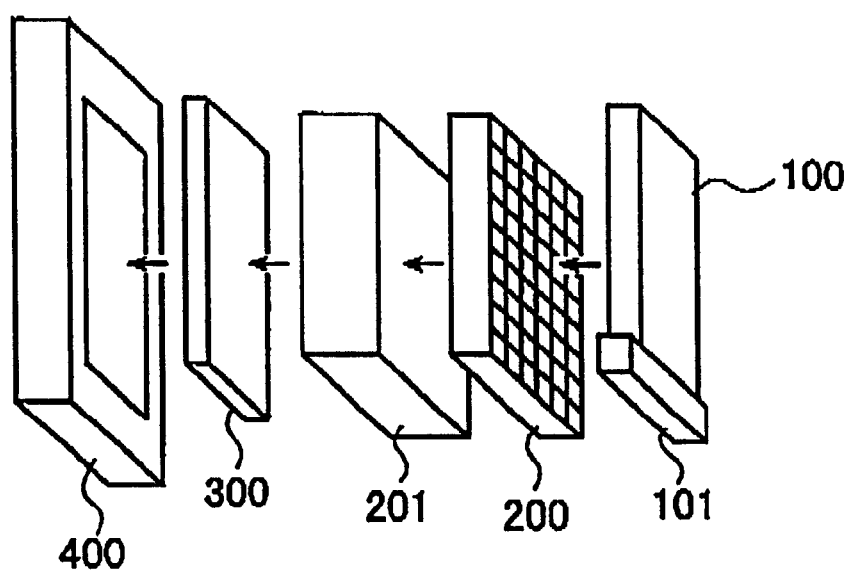
FIG. 9 is a perspective view illustrating a construction of another example of a conventional printing device.

As stated above, the conventional transfer apparatus disclosed in JP 11-242298 A, shown in FIG. 8 uses an LCD having a thickness of approximately 2.8 mm. As shown in the drawing, the LCD is formed by the two polarizing plates 301 and 305, the two substrates 302 and 304, and the liquid crystal layer 303 held between them. Although not stated in the above-mentioned publication, generally speaking, the thickness of liquid crystal itself is approximately 0.005 mm (refer to "Color TFT Liquid Crystal Display", p 207, published by Kyoritsu Shuppan). Thus, it is to be assumed that the sum total of the thickness of the substrate 301 (305) and the polarizing plate 302 (304) is approximately 1.3 mm to 1.4 mm.

Light diffusion degree is in proportion to a distance. Thus, when the above-mentioned thickness of 1.3 mm to 1.4 mm is reduced by half, the diffusion degree is also reduced by half, and it is to be assumed that the value "reduced by approximately 0.09 mm on one side", referred to with reference to the conventional art, is also reduced to ½, that is, approximately 0.04 mm to 0.05 mm. However, as stated with reference to the conventional art, with this level of diffusion degree, overlapping of adjacent dots occurs in a latest LCD with a minute dot size, such as UXGA or XGA.

That is, only when the diffusion degree is reduced to approximately 0.04 mm to 0.05 mm, the image obtained is rather unclear due to occurrence of dot overlapping and color blurring attributable thereto. However, quite unexpectedly, the study by the present inventors has shown that, as stated above, by setting the sum total of the thicknesses of at least the substrate 32 and the polarizing film 31 on the photosensitive film 4 side at not more than 1.0 mm, the color blurring due to dot overlapping is eliminated even in the casing of an LCD 3 of a minute dot size, such as UXGA or XGA, making it possible to obtain a clear transfer image. It is to be assumed that this is due to the fact that the scattering by the glass substrate 32 and the polarizing film 31 of the LCD 3 is reduced.

In the present embodiment, the photosensitive surface of the photosensitive film 4 is arranged having a predetermined gap between the photosensitive surface and the display screen of the LCD 3.

The film casing 51 accommodates a plurality of photosensitive films 4. In the present embodiment, it is possible to load a set (pack) of photosensitive films 4 in the film casing 51 mounted inside the main body casing 6 or to load a film pack 5 in which a plurality of photosensitive films 4 are accommodated in the attachable and detachable film casing 51 in the main body casing 6. It is preferably to adopt a construction in which the film pack 5 including the film casing 51, that is, the film casing 51 accommodating a plurality of photosensitive films 4 can be loaded.

The photosensitive film 4 is used as the photosensitive recording medium in the present embodiment. In the present embodiment, any type of photosensitive recording medium is available as long as it allows formation of a visible positive image by exposure printing of a transmitted display image of the LCD 3. There are no particular limitations in this regard. For example, it is preferable to use a so-called instant photographic film or the like. Examples of the photosensitive film 4 used as the photosensitive recording medium include "instaxmini or "instax"" (both manufactured by Fuji Photographic Film Co.), which is a mono-sheet type instant photographic film.

Such an instant photographic film is commercially available as a so-called film pack in which a predetermined number of films are accommodated in a film casing.

Thus, in the present embodiment, if an arrangement is possible in which the gap between the photosensitive surface of the photosensitive film 4 and the display screen of the LCD 3 meets the condition mentioned below, it is possible to load the film pack 5 as it is in the main body casing 6, as shown in FIG. 1.

Figure 5:
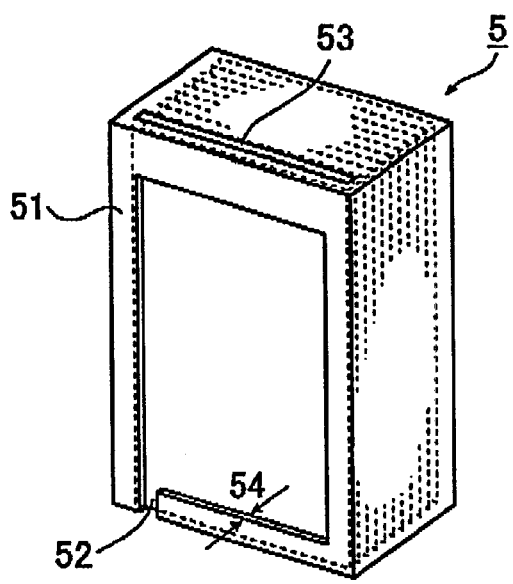
FIG. 5 is a perspective view depicting a construction of one example of a film pack used for the transfer apparatus depicted in FIG. 1.

FIG. 5 shows the construction of an embodiment of the film pack 5.

At one end of the film casing 51 of the film pack 5 shown, there is provided a cutout 52 into which a claw member can be invaded for extracting the film sheet 4 from the film pack 5 (the film casing 51), and the film sheet 4 which has undergone exposure is taken out from an outlet 53 of the film casing 51 of the film pack 5 by the above-mentioned claw member, and is transferred to a processing section by a conveying mechanism (not shown).

This "processing" section is meant by pushing open a processing liquid (developer) tube (not shown) beforehand provided at one end of the film sheet 4 and causing the developer to be uniform spread over the entire inner surface of the film sheet 4. It is executed substantially simultaneously with taking out the film sheet 4 from the film pack 5 and the conveyance thereof, After the processing, the film sheet 4 is conveyed to exterior of the apparatus through a take-out outlet 62 of the main body casing 6 (See FIG. 1).

As is well known, an instant photographic film of this type makes it possible to form a complete image for appreciation in about several ten seconds after the above-mentioned processing. Thus, in the transfer apparatus of the present embodiment, the function of performing up to the above-mentioned processing is required. After one film sheet has been sent out, the next film sheet appears, realizing a preparation state for the next exposure (transfer).

Regarding the method of handling this film pack described above, the instant camera using an instant photographic camera, disclosed in JP 4-194832 A by the assignee of the present application, is to be referred to.

In FIG. 4, numeral 54 indicates the height of the edge (stepped portion) of the film casing 51 of the film pack. By setting the height 54 of this edge at a desired dimension, it is possible to set the distance between the display surface of the LCD 3 and the photosensitive surface of the photosensitive film 4 at a predetermined value as mentioned below.

Therefore, in the present invention, apart from the fact that the height 54 of this edge is adjusted to a desired dimension, the film pack of a well-known conventional instant photographic film is applicable.

Even when the film casing 51 is beforehand mounted to the main body casing 6 and in which only one set of photosensitive films 4 is loaded into the film casing 51, it is possible to set the distance between the displaying surface of the LCD 3 and the photosensitive surface of the photosensitive film 4 at a size of a predetermined range as mentioned below by setting the height 54 of this edge at a desired dimension.

Optionally, in the example shown in FIG. 1, the film casing 51 is in direct contact with the display surface of the LCD 3 outside the effective image range of the photosensitive film 4. However, this should not be construed restrictively in the embodiment. When the height 54 of the edge of the film casing 51 is low, the film casing 51 may be mounted or loaded so as to be spaced apart from the display surface of the LCD 3 by a predetermined distance. Further, in the present embodiment, provided that the conditions mentioned below are satisfied, it is possible for the film casing 51 to be in contact with the holding panel externally holding the displaying surface of the LCD 3.

As above-mentioned, in the transfer apparatus, from required conditions in order to realize an apparatus actually easy to handle, the LCD 3 and the photosensitive film 4 are in a non-contact state. Strictly speaking, the display surface of LCD 3 and the photosensitive surface of the photosensitive film 4 are held in a non-contact state and spaced apart from each other by a predetermined distance. In accordance with the present embodiment, from the viewpoint of obtaining a clear transfer image, the disadvantage due to the above arrangement, i.e., increasing in light diffusion, is compensated for by the advantage of the suppression of light diffusion which is achieved by making the sum total of thicknesses of the glass substrate 32 and the polarizing film 31 on the photosensitive film 4 side of the LCD 3 mentioned above not more than a predetermined dimension.

That the LCD 3 and the photosensitive film 4 are arranged in a non-contact state is meant by that the display surface of the LCD 3 and the photosensitive surface of the photosensitive film 4 are spaced apart from each other by a predetermined distance and are not in direct contact with each other. Actually, as stated above, it is also possible to adopt an arrangement in which while the film casing 51 of the film pack 5 is in contact with the LCD outside the effective range of the image of the photosensitive film 4, there is a space between the photosensitive surface of the photosensitive film 4 and the display surface of the LCD 3.

Apart from this, it is also possible to adopt an arrangement in which there is provided between the display surface of the LCD 3 and the photosensitive surface of the photosensitive film 4 by way of a transparent glass plate or film of a predetermined thickness, thus substantially maintaining a predetermined distance between them and not holding them in direct contact with each other.

In the transfer apparatus of the present embodiment, the distance between the LCD 3 (i.e., its display surface) and the photosensitive film 4 (i.e., its photosensitive surface) is preferably 0.01 mm to 3 mm, more preferably 0.1 mm to 3 mm. As above-mentioned, this arrangement has rather disadvantageous from the viewpoint of obtaining a clear transfer image. However, this condition is necessary for realizing an apparatus actually easy to handle. The disadvantage due to this arrangement can be compensated for by the suppression of light diffusion, which can be achieved by making the sum total of the thickness of the glass substrate 32 and the polarizing film 31 on the photosensitive film 4 side of the LCD 3 mentioned above not more than a predetermined dimension.

In the transfer apparatus of the present embodiment, it is preferable that the size of the image displayed on the LCD 3 be substantially the same as the size of the image transferred to the photosensitive film 4. This is due to the fact that, in the present embodiment, a direct transfer system is adopted in which no enlargement or reduction is effected using a lens system, thereby making it possible to achieve a reduction in the size and weight of the entire apparatus.

The main body casing 6 is directed to a casing containing the above-mentioned components of the present embodiment, that is, the back light unit 1, the porous board 2, the LCD 3, the film pack 5 (or the film casing 51), a pair of rollers 61 for transferring a film which has undergone exposure and developing the processing liquid, and the like. In the main body casing 6, the pair of rollers 61 for transferring a film which has undergone exposure and developing the processing liquid are mounted at a position where they face the exposed-film take-out outlet 53 of the loaded film pack 5 (or the film casing 51). Further, the main body casing 6 has at a position facing this pair of rollers 61 the outlet 62 for extracting the exposed film 4 from the main body casing 6. Further, the main body casing 6 is provided with a back-up pressurizing pin 63 which is inserted from an opening on the back side of the exposed-film pack 5 and which presses the film sheets 4 against the front edge of the film casing 51, i.e., the LCD 3 side.

Although not shown, it goes without saying that the transfer apparatus of the present invention includes a drive source (motor) for driving the pair of rollers 61, a power source for driving the motor and lighting up the bar-shaped light source 11 of the back light unit 1, electrical equipment for controlling these components, a data processing device for receiving digital image data from a digital image data supply portion to display an image on the LCD 3 and converting the data into image data for LCD display, a control unit, etc.

The transfer apparatus of the present invention is basically constructed as above-mentioned.

EXAMPLES

A specific explanation will be made of embodiments of the transfer apparatus according to the present invention.

Using the transfer apparatus constructed as explained above and illustrated in FIG. 2, primarily the diameter of the through-holes 21, the thickness and other measurements of the porous board 2 and the reflectance of the inner surface of the through-holes 21 are altered, a digitally recorded image displayed on the LCD 3 is recorded onto the photosensitive film 4, and thus the recorded image is obtained. Optionally, the LCD 3 is prepared, whose display screen size is 3.5 inch. The backlight unit 1 is prepared, whose display screen size is 3.5 inch. A cold cathode tube (mono tube) whose length is 70 mm as the bar-shaped lamp 11. The clarity in a center of the backlight unit 1 is 2500 Lv after one minute from activation of the unit 1. Then the cold cathode tube is activated using a power supply of DC voltage 6.5 V. The color of the light source is expressed by x=y=0.297 which was measured by sepectroradiometry measurement CS1000 manufactured by MINOLTA, K.K.)

(Embodiment 1)

Figure 6:
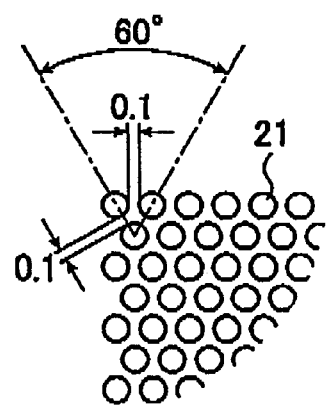
FIG. 6 is a diagram for explaining arrangement of through-holes in the porous board used in the embodiment.

First, regarding the porous board 2, the shape of the through-holes 21 is made to be circular, and the pitch thereof is set at 0.1 mm in the most dense state (here, see FIG. 6 which depicts the thickness of the partition). Note that the diameter of the through-holes 21 of the porous board 2 and the thickness of the porous board 2 may be prepared at various different levels, respectively. Accordingly, "dimensions of the thickness of the porous board and the through-holes of the porous board", which is described later, is realized at seven levels.

Further, the total thickness of the substrate 32 on the injection side and the polarized light film 31 on the photosensitive film 4 side is set at two levels of 1.3 mm and 0.93 mm, and the distance (spacer thickness) from the exit side (upper surface) of the porous board 2 to the LCD 3 is 2 mm. Note that the above-described film pack of "instax mini" which is above-mentioned, whose image size is three inches as a diagonal length of the film sheet, is used for the photosensitive film 4.

Using this construction, the dimension of a dot of the LCD 3 (i.e., short side) was set at two levels of 0.13 mm and 0.08 mm, the distance between the LCD 3 and the photosensitive film 4 was changed (three levels of 1 mm, 2 mm and 3 mm), and a transfer test was performed.

Comparative Example 1

The cross-section shape of the through-holes 21 of the porous board 2 is made into a 5 mm-diameter circle and 1.5 mm diameter circle (two levels), and the thickness thereof is set at 10 mm and 7.5 mm (two levels). Note that the distance (the spacer thickness) from the exit side (upper surface) of the porous board 2 to the LCD 3 is the same as in Embodiment 1, and that the total thickness for the substrate 32 plus the polarized light film 31 of the LCD 3 is 1.3 mm. Using this construction, the LCD 3 dot measurement (i.e., shorter side) was changed (i.e., to the 2 levels) and a distance between the LCD3 and the photosensitive film 4 (two levels of 1 mm and 5 mm) was changed. The transfer test was performed.

(Embodiment 2)

First, regarding the porous board 2, the shape of the through-holes 21 is made to be round, the diameter of the through-holes 21 is set at 0.5 mm, and the pitch thereof is set at 0.1 mm in the most dense state. The thickness of the porous board 2 (i.e., the length of the through-holes 21) was changed at 4 levels. Further, the distance (i.e., the spacer thickness) from the exit side (upper surface) of the porous board 2 to the LCD 3 is the same as in Embodiment 1, and the "instax mini" film pack is used for the photosensitive film 4 similar to Embodiment 1.

Further, regarding the material of the porous board 2 and the processing state of the inner surface of the through-holes 21, the following were prepared: (1) an aluminum board construction processed with a black, unpolished plate processing (in which the reflectance was made at multiple levels), and (2) carbon electrode material (graphite electrode ingredients delivered by KHS, K.K.).

Using this construction, the transfer test was performed using the LCD 3 dot measurement (i.e., short side) of 0.8 mm. Here, the total thickness of the substrate on the injection side and the polarized light film on the photosensitive film 4 side was 0.93 mm.

Comparative Example 2

Under the conditions similar to those of Embodiment 2, the porous board 2 in which blackening processing was performed on the inner surface of the through-holes 21 was prepared, and the transfer test was performed.

Note that in each of the transfer tests mentioned above, the duration of time during which the light source was lit up was adjusted so that the darkness of the obtained and transferred image would be more or less identical. Evaluation was performed by observing the transferred images in a microscope with a magnification of 10-fold, and the evaluations of the definition of the RGB dot were made in 5 levels according to the standard depicted in the table of chart 1.

The results for Embodiment 1 and Comparative Example 1 are organized and shown in the table of chart 2, and the results for Embodiment 2 and Comparative Example 2 are organized and shown in the table of chart 3.

TABLE 1

| Evaluation point | Status |
|---|---|
| 1 | RGB dots are very clearly visible. |
| 2 | RGB dots are clearly visible. |
| 3 | RGB dots are visible without overlapping. |
| 4 | Not more than half the RGB dots are overlapping. |
| 5 | RGB dots are overlapping and indistinguishable. |

TABLE 2

| Level | Thickness of substrate and polarizing film on photosensitive film side (mm) | Thickness of substrate and polarizing film on incident side (mm) | LCD dot shorter side length (mm) | Distance between LCD and photosensitive film (mm) | Diameter or equivalent diameter (mm) | Thickness (mm) | Thickness/diameter ratio | Evaluation |
|---|---|---|---|---|---|---|---|---|
| Example 1-1  | 1.3  | 1.3  | 0.13 | 1 | 5   | 15   | 3  | 3.5 |
| Example 1-2  | 1.3  | 1.3  | 0.13 | 1 | 5   | 25   | 5  | 2.5 |
| Example 1-3  | 0.93 | 0.93 | 0.13 | 1 | 5   | 15   | 3  | 3   |
| Example 1-4  | 0.93 | 0.93 | 0.13 | 1 | 3   | 9    | 3  | 3   |
| Example 1-5  | 0.93 | 0.93 | 0.13 | 1 | 1.5 | 4.5  | 3  | 3   |
| Example 1-6  | 0.93 | 0.93 | 0.08 | 1 | 1.5 | 4.5  | 3  | 3   |
| Example 1-7  | 0.93 | 0.93 | 0.08 | 1 | 1.5 | 7.5  | 5  | 1.5 |
| Example 1-8  | 0.93 | 0.93 | 0.08 | 2 | 1.5 | 7.5  | 5  | 1.5 |
| Example 1-9  | 0.93 | 0.93 | 0.08 | 2 | 1.5 | 10.5 | 7  | 1   |
| Example 1-10 | 0.93 | 0.93 | 0.08 | 1 | 0.5 | 5    | 10 | 1   |
| Example 1-11 | 0.93 | 0.93 | 0.08 | 1 | 0.5 | 10   | 20 | 1   |
| Example 1-12 | 0.93 | 0.93 | 0.08 | 1 | 0.5 | 20   | 40 | 1   |
| Example 1-13 | 0.93 | 0.93 | 0.08 | 2 | 0.5 | 1.5  | 3  | 3.5 |
| Example 1-14 | 0.93 | 0.93 | 0.08 | 2 | 0.5 | 5    | 10 | 1   |
| Example 1-15 | 0.93 | 0.93 | 0.08 | 2 | 0.5 | 10   | 20 | 1   |
| Example 1-16 | 0.93 | 0.93 | 0.08 | 1 | 0.2 | 2    | 10 | 1   |
| Example 1-17 | 0.93 | 0.93 | 0.08 | 3 | 1.5 | 7.5  | 5  | 2   |
| Example 1-18 | 0.93 | 0.93 | 0.08 | 3 | 0.5 | 5    | 10 | 1   |

TABLE 2-continued

| Level | Thickness of substrate and polarizing film on photosensitive film side (mm) | Thickness of substrate and polarizing film on incident side (mm) | LCD dot shorter side length (mm) | Distance between LCD and photosensitive film (mm) | Diameter or equivalent diameter (mm) | Thickness (mm) | Thickness/ diameter ratio | Evaluation |
|---|---|---|---|---|---|---|---|---|
| Comparative Example 1-1 | 1.3 | 1.3 | 0.13 | 1 | 5 | 10 | 2 | 5 |
| Comparative Example 1-2 | 1.3 | 1.3 | 0.08 | 1 | 5 | 10 | 2 | 5 |
| Comparative Example 1-3 | 0.93 | 0.93 | 0.08 | 5 | 1.5 | 7.5 | 5 | 5 |

TABLE 3

| Level | Thickness of substrate and polarizing film on photosensitive film side (mm) | Thickness of substrate and polarizing film on incident side (mm) | LCD dot shorter side length (mm) | Distance between LCD and photosensitive film (mm) | Porous board material, color, and processing, etc. (Reflectance) | Thickness/ diameter ratio | Evaluation |
|---|---|---|---|---|---|---|---|
| Example 2-1 | 0.93 | 0.93 | 0.08 | 1 | Al Black Plating (2%) | 3 | 3 |
| Example 2-2 | 0.93 | 0.93 | 0.08 | 1 | Al Black Plating (1%) | 5 | 2.5 |
| Example 2-3 | 0.93 | 0.93 | 0.08 | 1 | Al Black Plating (0.06%) | 10 | 1 |
| Example 2-4 | 0.93 | 0.93 | 0.08 | 1 | Carbon Electrode Material (0.15%) | 3 | 2 |
| Example 2-5 | 0.93 | 0.93 | 0.08 | 1 | Al Black Plating (0.06%) | 7 | 1 |
| Comparative Example 2-1 | 0.93 | 0.93 | 0.08 | 0 | Al-Metarized Color (12%) | 3 | 5 |
| Comparative Example 2-2 | 0.93 | 0.93 | 0.08 | 0 | Al Black Plating (3%) | 3 | 5 |

(Considerations regarding the results)

First, as shown in chart 2, the comparison of Embodiment 1 against Comparative Example 1 reveals that when the value of the "thickness of the porous board 2/diameter of the through-holes 21" becomes great, the definition of the transferred image improves significantly. In order to make this value be great, it can be said that it is preferable to make the diameter of the through-holes 21 be small, which also serves not to increase the thickness of the porous board 2.

Specifically, when the diameter of the through-holes 21 of the porous board 2 is made to be equal to or less than 5 mm, it is good for the value of the above-mentioned "thickness/diameter of the through-holes 21" of the porous board 2 to be tripled or greater, preferably 5 times or greater, more preferably 7 times or greater.

Actually, in Embodiment 1, in the casing where the value of the "thickness/diameter of the through-holes" of the porous board 2 is equal to 7 times or greater (see Embodiments 1–9 through 1–12, and Embodiments 1–14 through 1–16), the obtained transferred image has a high definition which rivals the results obtained from a transfer test using almost completely parallel light obtained through a collimator.

Further, when the above-mentioned value of "thickness of the porous board 2/diameter of the through-holes 21" is great, the distance between the LCD 3 and the photosensitive film 4 has almost no effect on the definition of the transferred image, especially in a casing where the distance is not more than 3 mm, this points are also advantages with respect to the production of the device.

According to Embodiment 1, regarding the thickness of the porous board 2, because of its relationship of this thickness to the dimensions of the through-holes 21 provided to the porous board 2, the "thickness/dimensions of the through-holes" of the porous board 2 is treated as a single coefficient, and it has been understood that when this is made to be of a certain value or greater, then the effect is great. Therefore, this value can be said to indicate the extent to which the light passing through the porous board 2 is approaching parallel light.

In order to make this "thickness/dimensions of the through-holes" of the porous board 2 larger, in specific terms, it is effective to make the dimensions of the through-holes 21 smaller, or make the thickness of the porous board 2 thicker. However, in order to make the entire device thinner, it can be said that the former approach is better. Further, due to limitations arising in production, there is a limitation as to the dimensions of the through-holes 21 at 0.2 mm. For practical purposes, approximately 0.5 mm–2 mm is good. It can be said that a thickness of about 3 mm–20 mm is practical.

Next, as is depicted in chart 3, in the comparison between Embodiment 2 and Comparative Example 2, the presence or absence of the blackening processing on the inner surface of the through-holes 21 of the porous board 2 creates a great difference in the definition of the transferred image. Further, it is worth making particular reference to the fact that when the reflectance of the inner surface of the through-holes 21 of the porous board 2, which is obtained as a result of the blackening processing on the inner surface of the through-holes 21 of the porous board 2, is of a value equal to or less than 2%, then there is a great difference from the definition of the transferred image which is obtained in the casing when the value is equal to or greater than 3%.

Note that for the reflectance of the inner surface of the through-holes 21 of the porous board 2 indicated here, because it is difficult to take direct measurements, a value was used which was measured with a wavelength of 550 nm and on a flat material having been processed according to the same processing conditions, by using a spectrum reflectance measuring instrument such as the MPC3100 manufactured by Shimazu Production, K.K.

According to Embodiment 2, when the porous board 2 in which the thickness is equal to or greater than three times the diameter (or the corresponding diameter) of the through-holes 21 and at least the inter surfaces of the through-holes 21 are constructed as low reflectance surfaces is used, then a significantly clear image can be obtained as the transferred image. In particular, when the thickness is equal to or greater than seven times the diameter of the through-holes 21, then it is possible to obtain a degree which rivals the transferred image of parallel light produced by means of the collimator.

Figure 7A:
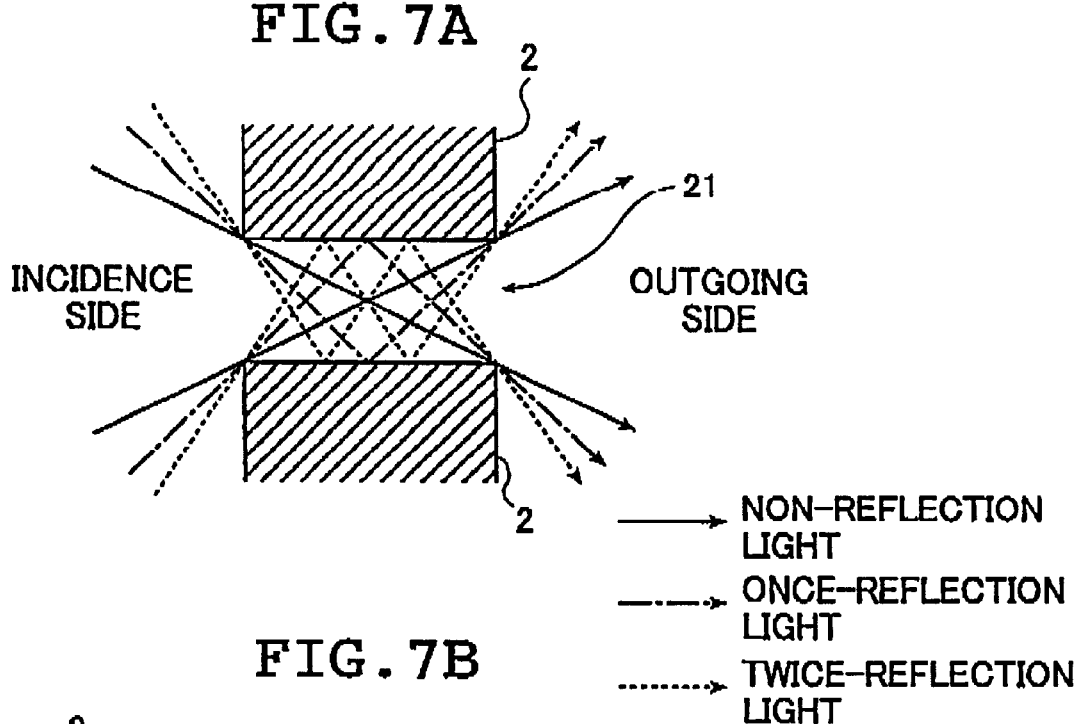
FIG. 7A and FIG. 7B are diagrams schematically depicting a reflection pattern of injected light inside the holes of the porous board.
Figure 7B:
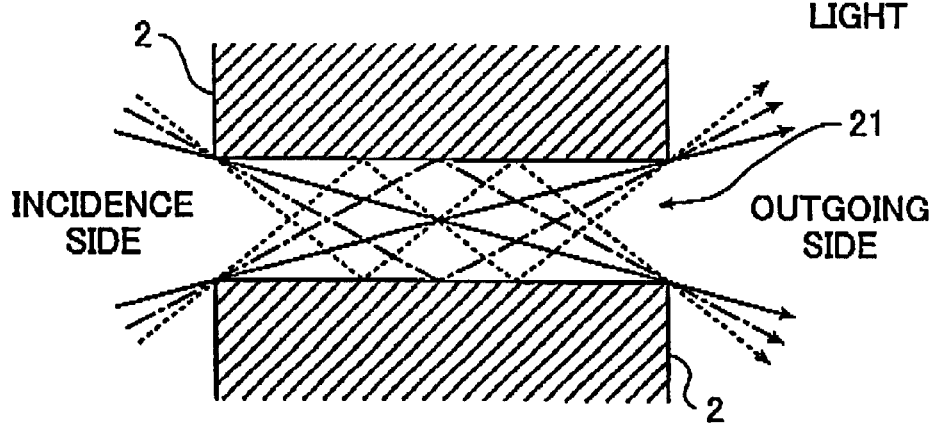

FIG. 7A and FIG. 7B depict expanded cross-sectional diagrams of the through-holes 21 mentioned above. Here, the pattern of reflection on the inside of the through-holes 21 for two porous boards 2 having different thicknesses (i.e., difference values of the above-mentioned "thickness/diameter of through-holes") in the casing where the injection angle of the injected light is changed to three types. However, as is clear from these diagrams, it is understood that even if the diameters of the through-holes 21 in the porous boards 2 are the same, the action of eliminating the scattered light is remarkably enhanced as the porous board 2 becomes thicker. Further, by making the inner surfaces of the through-holes 21 non-reflective, the reflected light components become fewer and it becomes possible to obtain light that is closer to parallel light.

It goes without saying that this type of action of eliminating the scattered light produces a great effect of improving the definition of the transferred image. In order to obtain this effect in a practical manner, it is effective to make the diameter of the through-holes 21 be somewhat small and to increase the thickness of the porous board 2, and this also has advantages in connection with production. Note that, as mentioned above, it is necessary to make the inner surfaces of the through-holes 21 non-reflective (i.e., by treating the surfaces with reflection prevention processing, or by using material having low reflectance). Accordingly, the reflected light components become fewer and it is possible to obtain light closer to parallel light.

In Embodiment 2 as well, just as in Embodiment 1, the dimensions of the through-holes 21 of the porous board 2 have a limit of approximately 0.2 mm due to limitations relating to production, and dimensions of approximately 0.5 mm–2 mm are practical. Further, it is understood that for the thickness of the porous board 2, approximately 3 mm–20 mm is practical. Note that there are no particular limitations on the methods of processing for preventing reflection, and the like, and this method may be selected freely so long as it obtains the effect.

The effect that is obtained by the transfer apparatus according to the present invention is clear from the above results. That is, the above-mentioned results illustrate that in the transfer apparatus according to the present invention, the thickness of the porous board and the dimensions of the through-holes in this porous board, which is arranged between the light source and the LCD to serve as the substantially parallel light generating element, are regulated as described above, desirably, the inner surfaces of the through-holes are made to have low reflectance, whereby the large improvement of the definition of the transferred image can be achieved.

(Examination of the Results)

As shown in Table 2, from the comparison of Example 1 and Comparative Example 1, it can be seen that when the sum total of the thicknesses of the substrate 32 and the polarizing film 31 on the incident side and the photosensitive film 4 side is less than 1 mm, and the thickness of the porous board 2 is three times the diameter of the through-hole 21, the dot transfer condition is markedly improved. In this casing, the dot dimension (shorter side) of the LCD 3 does not influence so much.

As stated above the reduction in the sum total of the thicknesses of the substrate 32 and the polarizing film 31 on the incident side and the photosensitive film 4 side is very effective in improving the image quality. Specifically, when the sum total thickness varies as: 0.93 mm, 0.75 mm, and 0.57 mm, the difference is clearly to be seen (comparison of Examples 2–1 through 2–4, Examples 2–5 through 2–8).

The distance between the LCD 3 and the photosensitive film 4 does not influence the image quality so much as long as it is within the range of approximately 2 mm (comparison of Example 2–7 and Example 2–8). This is very advantageous in producing the device because it facilitates the handling of the photosensitive film 4 (film sheet).

As shown in Table 3, from the comparison of Example 3 and Comparative Example 3, it can be seen that while there is no great change as long as the distance between the LCD 3 and the photosensitive film 4 is approximately 2 mm or less, the dot transfer condition (clarity) deteriorates when the distance exceeds 3 mm.

The fact that the distance between the LCD 3 and the photosensitive film 4 does not influence the image quality so much as long as it is not more than 3 mm is very advantageous in producing the device because it helps to facilitate the handling of the photosensitive film 4 (the above-mentioned film sheet). It can be seen that, as the distance between the LCD 3 and the photosensitive film 4 is gradually shortened as: 2 mm, 1 mm, and 0.5 mm, the evaluation becomes higher, providing increasingly satisfactory results.

Regarding the thickness of the porous board 2, it can be seen that, from the relationship with it and the dimension of the holes provided in the porous board 2, a markedly preferable effect is achieved when the value of the coefficient: "porous board-thickness/porous board-hole-dimension" is not smaller than a certain value. That is, the above-mentioned value indicates the degree to which the light transmitted through the porous board is approximated to parallel rays.

Specifically, a reduction in the dimension of the holes or an increase in the thickness of the porous board is effective. To achieve a reduction in the thickness of the entire device, however, the former is more preferable. Due to the limitations in production, the upper limit of the hole dimension is approximately 0.2 mm. From the practical point of view, it is preferably approximately 0.5 mm to 2 mm. Regarding the thickness, it is preferably approximately 3 mm to 20 mm from the practical point of view. While in the above example the value of the "porous board-thickness/porous board-dimension" is 3, this value is preferably 5 or less, and more preferably 7 or less.

Another experiment showed that, due to the reduction in the LCD dot size, each dot was not so clearly transferred as compared with the casing of the "transfer apparatus" disclosed in JP 11-242298 A. In particular, when the LCD dot size is not more than 0.2 mm, the tendency is remarkable.

From the above results, the effect obtained by the transfer apparatus of the present invention is obvious.

That is, in the transfer apparatus of the present invention, the sum total of the thicknesses of the substrate and the polarizing film at least on the photosensitive film side of the LCD is set to not more than a predetermined value, that is, not more than 1.0 mm, more preferably 0.8 mm or less, and most preferably not more than 0.6 mm, whereby it is possible to substantially improve the clarity of the transferred image. Further, as can be seen, by spacing apart the LCD and the photosensitive film from each other by a predetermined distance of 0.01 to 3 mm, it is possible to obtain a device which is easy to handle and of a simple structure, making it possible to substantially improve the clarity of the transferred image.

Thus, in the transfer apparatus of the present invention, it is possible to set the sum total of the thicknesses of the substrate and the polarizing film on the photosensitive film side of the LCD, and the distance between the LCD and the photosensitive film in accordance with the clarity desired of the transfer image.

While various embodiments and examples of the transfer apparatus of the present invention have been described in detail, the present invention is not restricted to these embodiments and examples. Various improvements and modifications are naturally possible without departing from the scope of the invention. For example, the back light as the light source and the LCD as the image display means are not restricted to the above-described ones. It is also possible to adopt one with various functions within the permissible range. Further, the digital-recorded image (digital image data) used in the present invention may also be a transmission original consisting, for example, of a photographic film, such as a negative film or a reversal film, or a digital-recorded image read from a reflection original, such as a photograph, by a scanner or the like.

As described above in detail, in accordance with the present invention, it is possible to realize a transfer apparatus, which makes it possible, with a simple structure, to truly realize a reduction in size, weight, power consumption, and cost.

The effect of the present invention can be further enhanced by adding the above-mentioned additional conditions to the above-described basic construction.

Further, according to the present invention, the scattered light elements of the light injected into the transmission-type image display means is removed, this light is made to have only elements closer to those of parallel light, and the light can be injected into the image display means at a perpendicular angle. Accordingly, an image having a high definition can be transferred (image formation) on a photosensitive recording medium by the light carrying the display image that has passed through the image display means. Thus, the transferred image having a definition can be obtained.

What is claimed is:

1. A transfer apparatus having a light source, a substantially parallel light generating element, a transmission-type image display unit and a photosensitive recording medium which are arranged in a series along a traveling direction of light of said light source, for transferring onto the photosensitive recording medium a display image passed through said transmission-type image display unit, wherein said substantially parallel light generating element comprises a porous board having a plurality of through-holes, and a thickness of said porous board is equal to or greater than three times one of a diameter and a corresponding calculated diameter of each of said through-holes, and wherein substantially parallel light is obtained by passing said light from said light source through said plurality of through-holes of said substantially parallel light generating element.

2. The transfer apparatus according to claim 1, wherein at least inner surfaces of the plurality of through-holes have a reflectance of 2% or less.

3. The transfer apparatus according to claim 1, wherein a cross-sectional shape of a through-hole of said plurality of through-holes in said porous board is round or polygonal.

4. The transfer apparatus according to claim 1, wherein a size of said image displayed on said image display unit is substantially the same as a size of said image transferred to said photosensitive film.

5. The transfer apparatus according to claim 1, wherein a size of each pixel of said image display unit is equal to or less than 0.2 mm.

6. The transfer apparatus according to claim 1, wherein said image display unit is a liquid crystal display.

7. A substantially parallel light generating element designed for a transfer apparatus having a light source, said substantially parallel light generating element, a transmission-type image display unit and a photosensitive recording medium arranged in a series along a traveling direction of light from the light source, configured to transfer onto the photosensitive recording medium a display image transmitted through the transmission-type image display unit, wherein said substantially parallel light generating element comprises a porous board having a plurality of through-holes, a thickness of said porous board being equal to or greater than three times one of a diameter and a corresponding calculated diameter of each of said through-holes.

8. The substantially parallel light generating element of claim 7, wherein at least inner surfaces of the plurality of through-holes have a reflectance of 2% or less.

9. The substantially parallel light generating element of claim 8, wherein a cross-sectional shape of a through-hole of the plurality of through-holes in said porous board is round or polygonal.

10. The substantially parallel light generating element of claim 9, wherein a size of said image displayed on said image display unit is substantially the same as a size of the image transferred to the photosensitive film.

11. The substantially parallel light generating element of claim 10, wherein a size of each pixel of the image display unit is equal to or less than 0.2 mm.

12. The substantially parallel light generating element of claim 11, wherein the image display unit is a liquid crystal display.

* * * * *